US010893378B2

(12) United States Patent
De Ruijsscher

(10) Patent No.: US 10,893,378 B2
(45) Date of Patent: Jan. 12, 2021

(54) METHOD AND SYSTEM OF PRESENCE DETECTION

(71) Applicant: Epesi Creative New Media B.V., Middelburg (NL)

(72) Inventor: Bart Gustaaf Camiel De Ruijsscher, Middelburg (NL)

(73) Assignee: EPESI CREATIVE NEW MEDIA B.V., Middelburg (NL)

( * ) Notice: Subject to any disclaimer, the term of this patent is extended or adjusted under 35 U.S.C. 154(b) by 0 days.

(21) Appl. No.: 16/622,539

(22) PCT Filed: Jun. 26, 2018

(86) PCT No.: PCT/NL2018/050410
§ 371 (c)(1),
(2) Date: Dec. 13, 2019

(87) PCT Pub. No.: WO2019/004822
PCT Pub. Date: Jan. 3, 2019

(65) Prior Publication Data
US 2020/0213803 A1 Jul. 2, 2020

(30) Foreign Application Priority Data

Jun. 26, 2017 (NL) ..................................... 2019123

(51) Int. Cl.
| | | |
|---|---|---|
| *H04W 24/00* | (2009.01) | |
| *H04W 4/021* | (2018.01) | |
| *H04W 4/80* | (2018.01) | |
| *H04W 12/00* | (2009.01) | |
| *H04M 1/725* | (2006.01) | |

(52) U.S. Cl.
CPC ............. *H04W 4/021* (2013.01); *H04W 4/80* (2018.02); *H04W 12/009* (2019.01); *H04W 12/0051* (2019.01); *H04M 1/72519* (2013.01); *H04M 1/72522* (2013.01)

(58) Field of Classification Search
CPC ... H04W 4/021; H04W 4/80; H04W 12/0051; H04W 12/009; H04W 1/72522; H04W 88/02; H04W 8/245; H04M 1/72519
USPC .......................... 455/456.1, 411, 550, 1, 418
See application file for complete search history.

(56) References Cited

U.S. PATENT DOCUMENTS

| | | | |
|---|---|---|---|
| 9,538,578 B1 * | 1/2017 | Stamatakis | .............. H04B 1/38 |
| 9,642,007 B1 * | 5/2017 | Pesola | .................. H04L 67/306 |
| 9,928,536 B2 * | 3/2018 | Fernandez | .............. H04W 4/70 |
| 10,388,135 B1 * | 8/2019 | Jordan, II | .............. G08B 7/066 |
| 10,473,504 B2 * | 11/2019 | Glenn | ..................... H04W 4/70 |

(Continued)

FOREIGN PATENT DOCUMENTS

WO    WO-2016154129    9/2016

*Primary Examiner* — Danh C Le
(74) *Attorney, Agent, or Firm* — Marcus C. Dawes

(57) ABSTRACT

The present disclosure reveals a method and system to reliably detect the physical presence in a certain area of a preferably authenticated token holder (for example a User or the owner of a smart device) who preferably has explicitly consented to this process. It can be used on premise with any wireless communication technology that supports connection-less advertising or broadcasting. A straightforward use-case for these methods is the detection of users (such as customers) in physical locations (such as shops).

14 Claims, 4 Drawing Sheets

(56) References Cited

U.S. PATENT DOCUMENTS

Figure 1:
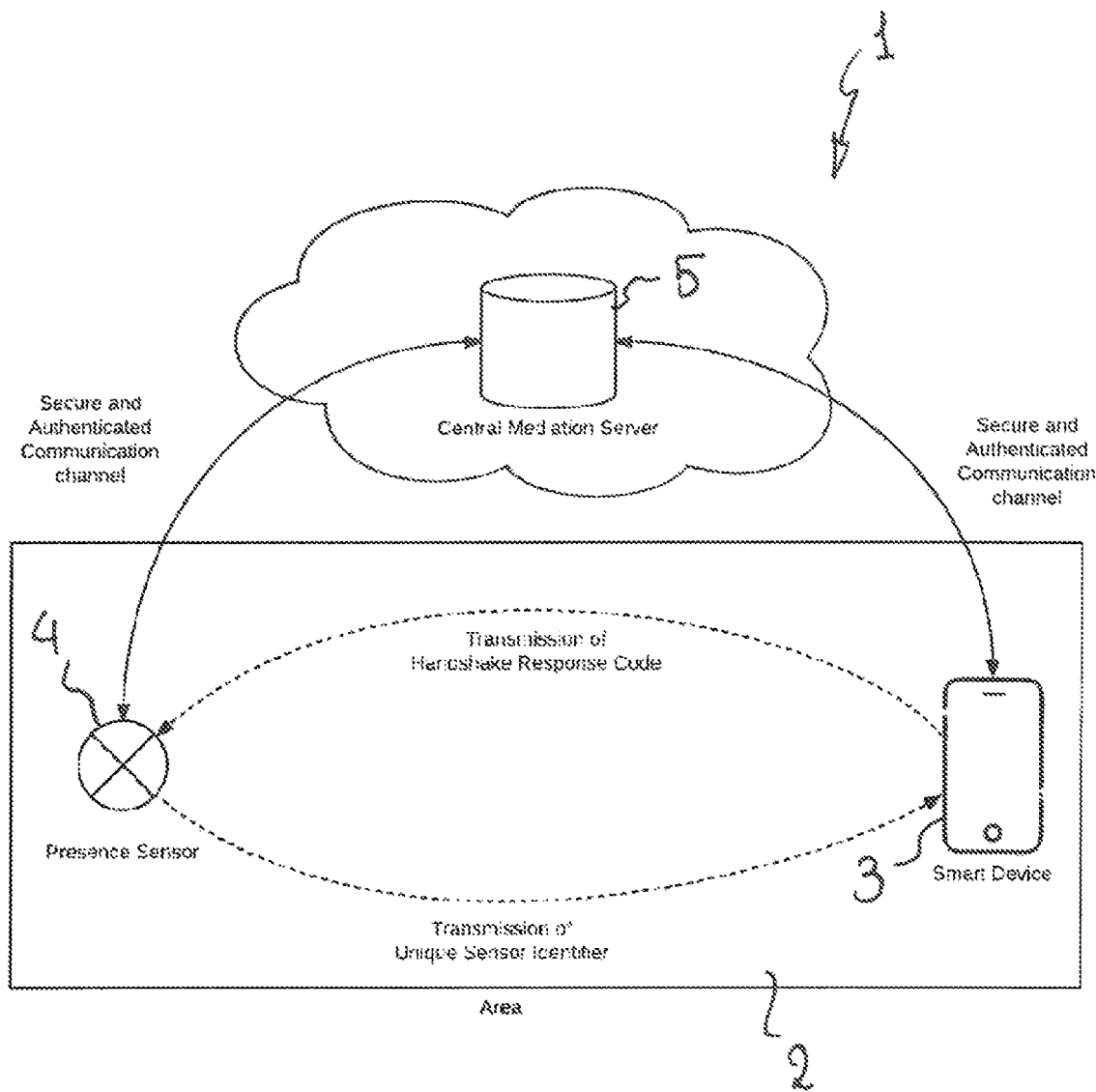

| | | | | |
|---|---|---|---|---|
| 2012/0203508 A1* | 8/2012 | Hamzaoui | ............... | G06F 21/55 |
| | | | | 702/183 |
| 2012/0260329 A1* | 10/2012 | Suffling | ............. | H04L 63/1458 |
| | | | | 726/9 |
| 2014/0006586 A1* | 1/2014 | Hong | ...................... | H04W 8/26 |
| | | | | 709/223 |
| 2015/0003433 A1 | 1/2015 | Sinha | | |
| 2015/0123787 A1* | 5/2015 | Watson | .................. | G06Q 10/06 |
| | | | | 340/539.13 |
| 2015/0199552 A1* | 7/2015 | Du | ....................... | G06K 9/4642 |
| | | | | 382/124 |
| 2015/0223021 A1* | 8/2015 | Wildon | ................... | G01S 19/16 |
| | | | | 340/539.32 |
| 2015/0373010 A1* | 12/2015 | Zhang | .................. | H04L 63/083 |
| | | | | 726/7 |
| 2016/0294829 A1* | 10/2016 | Angus | .................. | H04L 9/3247 |
| 2016/0328187 A1* | 11/2016 | Nathani | ................ | G06F 3/1205 |
| 2017/0039007 A1* | 2/2017 | Nathani | ................ | G06F 3/1238 |
| 2017/0124350 A1* | 5/2017 | Reihman | ................ | A61B 5/746 |
| 2017/0171754 A1 | 6/2017 | South | | |
| 2018/0102039 A1* | 4/2018 | Furuland | ............ | G08B 21/0461 |
| 2018/0181961 A1* | 6/2018 | Nair | ................... | G06Q 20/3223 |
| 2019/0123907 A1* | 4/2019 | Kim | ....................... | H04L 9/302 |

\* cited by examiner

METHOD AND SYSTEM OF PRESENCE DETECTION

The present disclosure relates to a method of and a system to perform presence detection. The system comprise and the method is based on the presence of: stationary sensors at predetermined locations; at least one user owned mobile terminal such as a smart device; and a server storing links between each of the sensors and a location thereof.

To the best knowledge of the inventors of the present disclosure, known methods and system are insufficiently secure, insufficiently reliable and can be tricked into erroneous detection results.

For instance systems US-2015/003433 relates to a method that relies solely on a smart device detecting an identifier broadcast by a transmitter that is subsequently translated to a specific area by a server, e.g. through a stored predetermined link between the identifier broadcast by the transmitter and a location thereof. When such an approach is used for presence detection of a token holder, i.e. the owner of the smart device, it is quite possible to spoof the token holder's smart device and/or transmitter if the identifier is copied and broadcast in a different area. This is referred to herein as "spoofing". When the smart device detects the spoofed (copied) identifier it will result in a false presence detection result.

According to the present disclosure, methods and systems distinguish over the prior art with respect to the features in the characterising portions of the appended independent method and system claims, and by communicating along the entire system of the server, terminal and sensor proximate a terminal, thereby eliminating the possibility of spoofing. Location determination of a user and owner of a terminal is thereby enormously improved. The present disclosure relates to a method and system to reliably detect the physical presence in a certain area of a preferably authenticated token holder (for example a User or the owner of a smart device) who preferable has explicitly consented to this process. It can be used on premise with any wireless communication technology that supports connection-less advertising or broadcasting.

Relative to the prior art disclosure of US-2015/003433, the skilled person is confronted with a problem of network load and of complexity of the method and associated systems, as well as a desire to alleviate these problems without compromising security against spoofing.

The disclosure of US-2015/003433 relates merely to a handshake protocol to initiate local connectivity between the detector or an access point and a mobile device, whereas the present disclosure relates to secure presence detection even without such local connectivity.

The disclosure of US-2015/003433 is based on connectivity over a WLAN between a device (106) and an Access Point, whereas the present disclosure allows secure presence detection even without a device establishing connectivity of the device to a local network. The present disclosure is based on the fact that a presence detection sensor has a connection with a server to implement the method, e.g. via a WLAN, and the device has its own connection with the server, e.g. over mobile internet access, where the device could have such a connection to the server even via another network than the detector, and therefore without the aforementioned local connectivity between the device and the detector. In contrast, the teaching of US-2015/003433 requires local connectivity between the detector and the device to which end the disclosed handshake protocol is performed, as is apparent from US-2015/003433 which refers e.g. in paragraphs 0014 and 0017 to an access based network and requiring a system with connectivity to a wireless local area network, being an access network, and disclosing that networks are operable to provide communications between at least one mobile device and a central server, wherein for the WLAN, communications between mobile devices and the central server is via one or more access point (110).

Consequently, although US-2015/003433 allows device detection wherein establishing a local connection of the device to be detected to the WIFI network's wireless access point allows a functionality of device detection as an extension of regular WIFI/WLAN functions, because merely establishing an access connection will normally not suffice for secure device detection, where a distinct spoofing risk remains. Consequently, the present disclosure and the teaching of US-2015/003433 differ in at least the requirement of local connectivity, where device detection is impossible if the device does not engage in local connectivity to the WLAN/WIFI, in which the detector is also connected, and consequently relates to a more limited and potentially even flawed technology, as local connectivity is required for presence detection, and reliability of presence detection is enhanced to some extent, but only when the device engages in local connectivity to the WLAN/WIFI.

Embodiments of US-2015/003433 exhibit further disadvantages. For instance an additional beacon may be required, contributing only to numbers of components and complexity, while the present disclosure aims to achieve secure presence detection, without the added components and associated complexity of US-2015/003433.

A beacon is, by the way, based on rather generic technical principles to localise a device relative thereto, based on tag/beacon detection by a device to result, when a floorplan is known, in an estimation of the location of the device relative to the beacon/tag.

Regarding the teaching in US-2015/003433 of a BLE key exchange function, it is noted here that the local access point must then manage a separate BLE tag 208 and will then only respond to a probe request from the device. According to the present disclosure, there's no need to manage any separate tag or corresponding knowledge what tag to "listen" to, as in US-2015/003433, whereby a considerable simplification may be readily achieved.

Further, the teaching of US-2015/03433 is based in par. 0031 on the device sending a probe request to the access point, but on an application level such a probe request is not possible as operating systems of devices do not allow such low software level operations. To render the teachings of US-2015/003433 practically implementable would require adding separate hardware, which is not provided standard in (mobile) devices such as mobile phones.

As a final consideration it is noted here that the teaching of US-2015/03433 is based in par. 0037 on the access point having to send communications to the device to confirm that physical presence has been validated. This communication also contributes to the complexity of the teachings of US-2015/003433 for the access point, and it is an objective of the present disclosure to reduce complexity, which is achieved in that the server performs such communications to the device.

A straightforward use-case for these methods is the detection of users (such as customers) in physical locations (such as shops).

To this end the method involves the steps of the appended independent method claim, as well as in many jurisdictions alternatives for the defined features, comprising:

broadcasting, by the sensor, a sensor identifier from each of the sensors;

detecting, by the terminal, at least one of the sensor identifiers;

forwarding, by the terminal, the detected sensor identifier to the server; and determining, by the server, of a location of the terminal to be the same as that of the sensor, based on the sensor identifier, characterized by sending, by the server, of a verification request, based on the received sensor identifier, to at least one of the sensor and the terminal;

generating, by the at least one of the sensor and the terminal, of a response to the verification request and transmitting the response to the other of the sensor and the terminal;

generating, by the other of the sensor and the terminal, of a validation request based on the received response and transmitting the validation request to the server;

validating, by the server, of the validation request based on the response to the verification request.

In contrast with the prior art method and system according to US-2015/003433, the present disclosure proposes to omit involvement of the server from the final steps of the method by transmitting the response to the verification request from the at least one of the sensor and the terminal to the other of the sensor and the terminal; and generating, by the other of the sensor and the terminal, of the validation request based on the received response to the verification request for transmission of the validation request to the server. This allows a considerable alleviation in traffic to and from the server, restricting previously global communications to a local environment, as well as a considerable simplification of the method in practice, while allowing surprisingly that the security against spoofing is maintained, where the skilled person would not have considered that the proposed simplification could be achieved without compromising security against spoofing.

The system involves the components thereof which are configured to contribute to performing the method.

In the following embodiment description and in the appended dependent claims, preferred embodiments are defined, to which the scope of the present disclosure is by no means limited and may encompass obvious alternatives even for features in the appended independent claims.

In essence, two alternative approaches may be followed, in that verification is initiated by the server sending the verification request to either the terminal or to the sensor. However, it is explicitly not excluded that the server addresses both the terminal and the sensor with separate verification requests.

A very beneficial embodiment is such that the verification request is merely received at the terminal and/or the sensor and forwarded to the other, i.e. without processing or changing the content of the verification request, to minimize an increase in load for all components involved. If the server receives back the verification request after passing it through the sensor and the terminal or through the terminal and the sensor, an irrefutable proof is obtained that the terminal is proximate a particular one of the sensors, to be able to more reliably determine the location of the terminal at the sensor.

Figure 2:
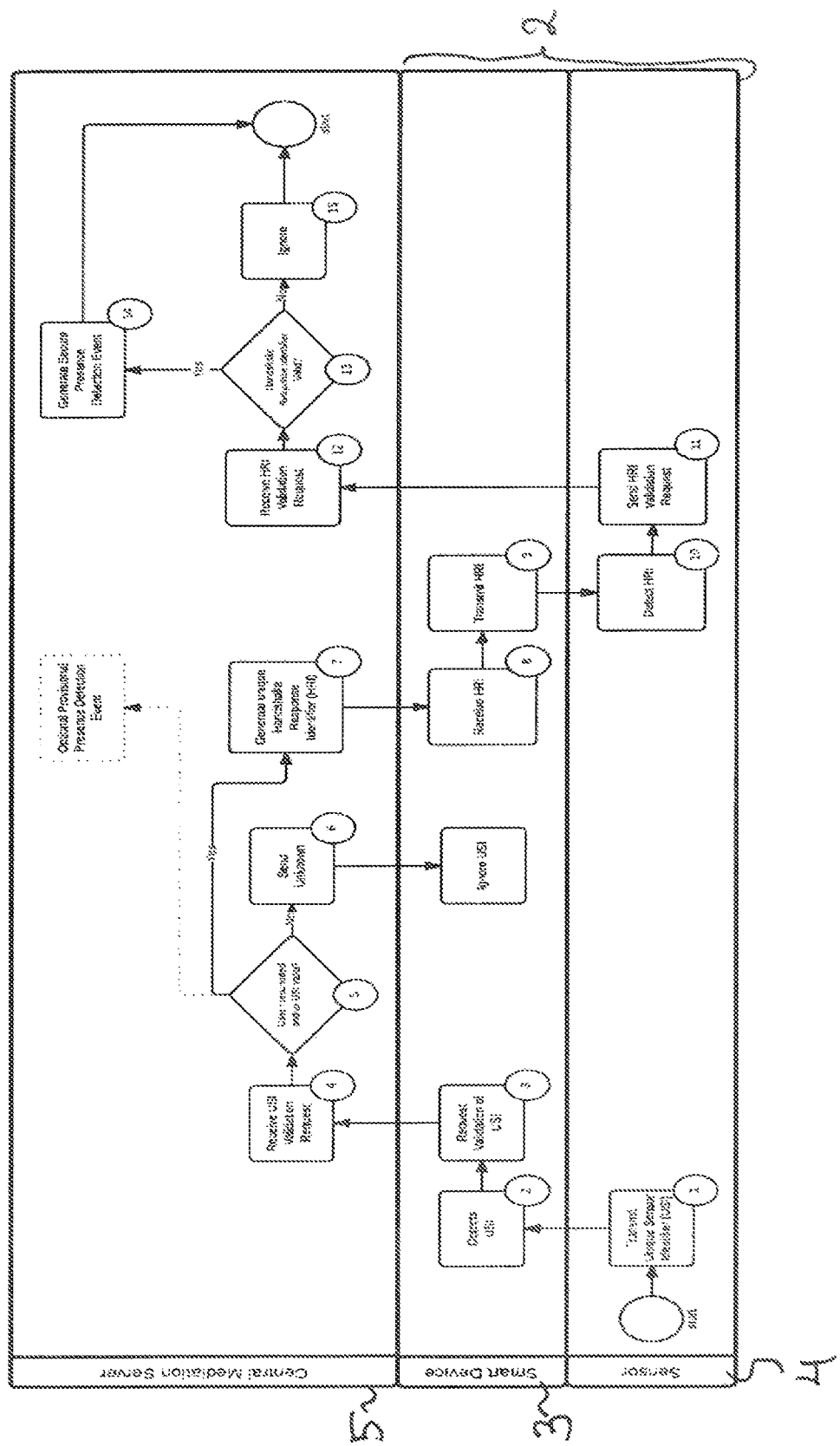
Figure 3:
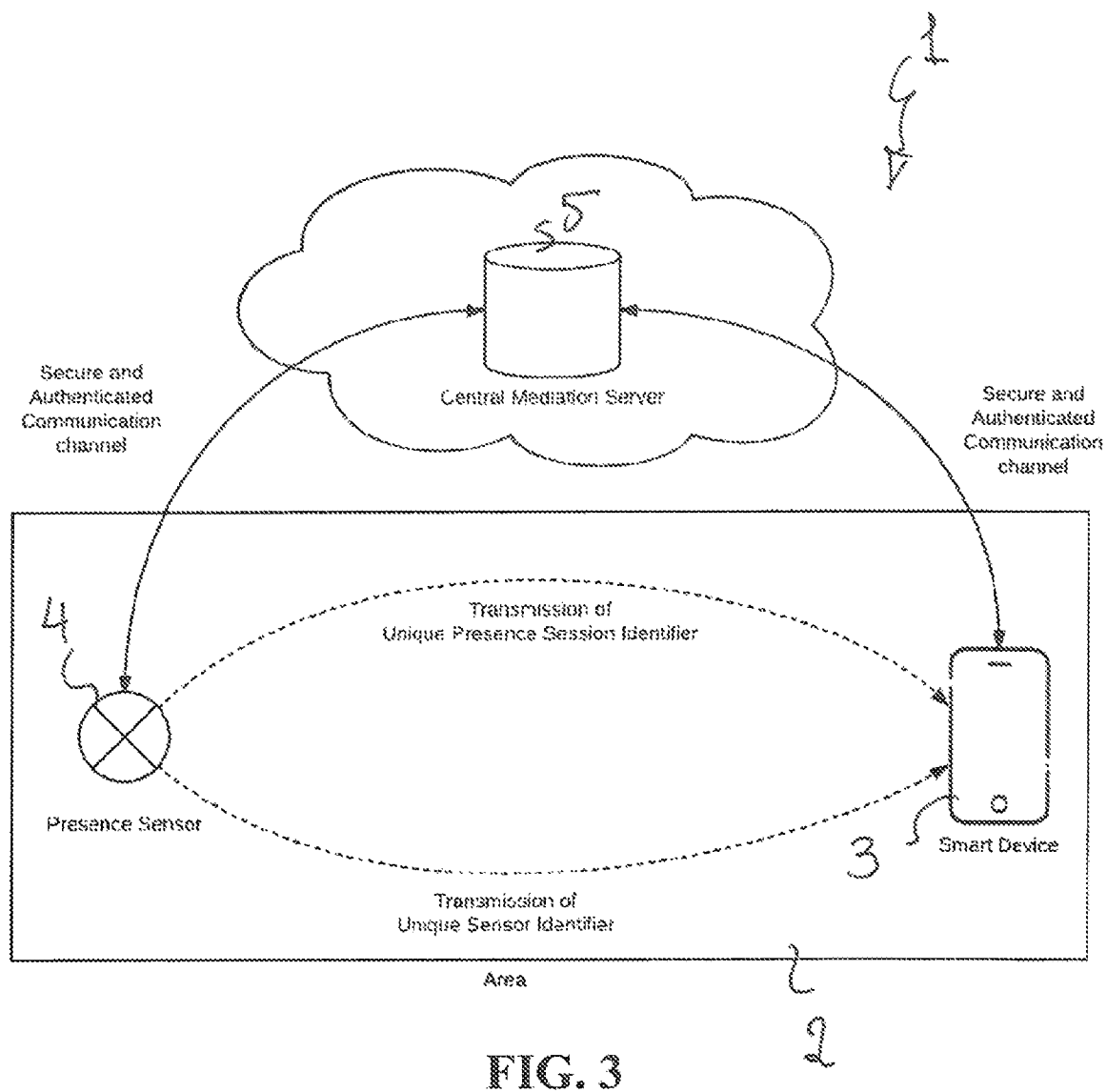
Figure 4:
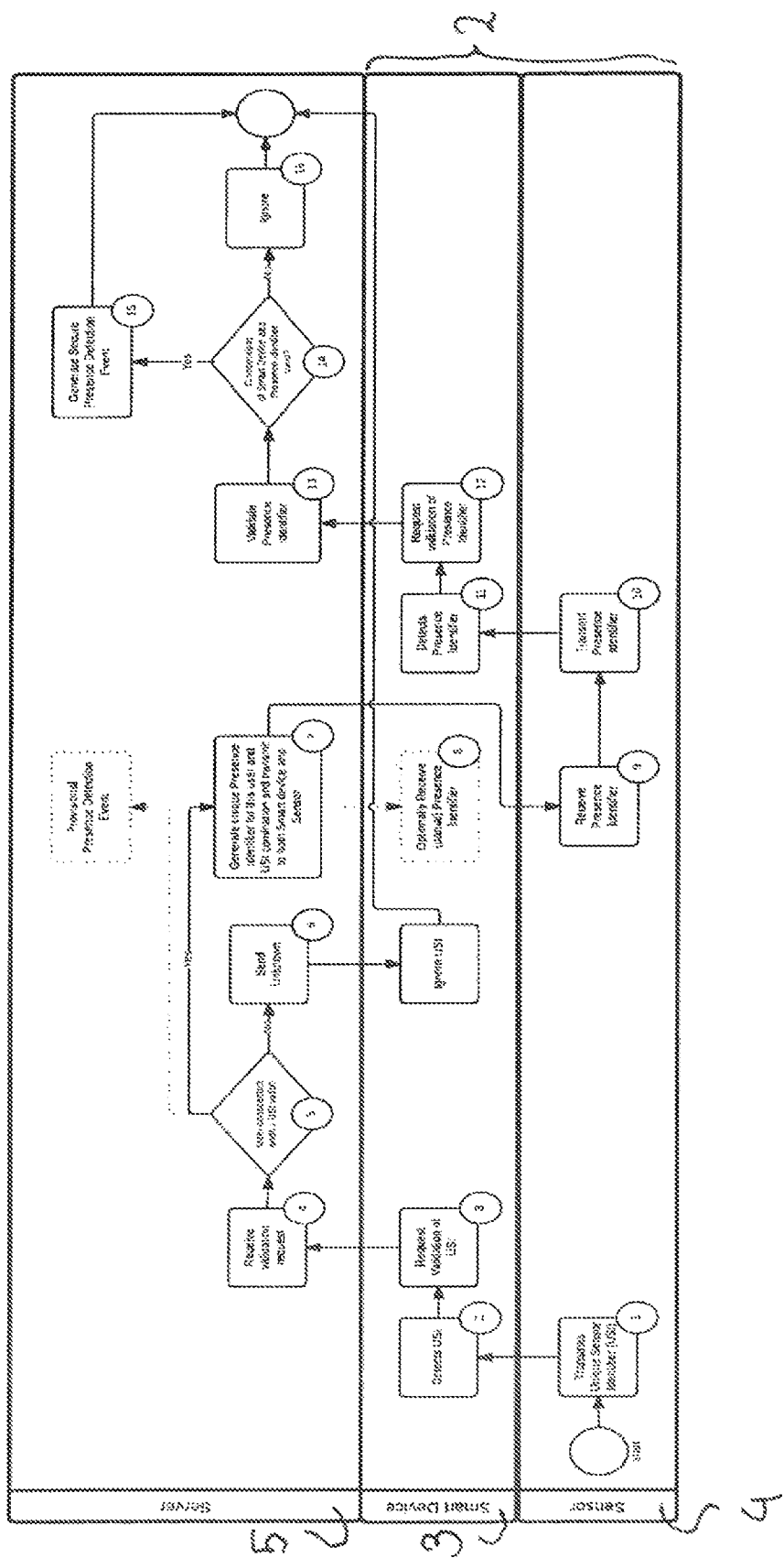

Following the above properties and indications of the invention in terms and expressions of the appended claims, below an embodiment description is provided, in which reference is made to the appended drawing. Throughout the embodiment description and in the figures, the same or similar reference signs may be employed to indicate the same or similar elements, component, features or steps, even in conjunction with differing embodiments. In the appended drawing:

FIGS. 1 and 2 exhibit a first embodiment of a system and method according to the present disclosure, and FIGS. 3 and 4 exhibit a second embodiment of a system and method according to the present disclosure.

Both embodiments disclosed herein provide additional measures to prevent the above mentioned false detection scenario that may occur in prior art. An added trusted communication link between the server and either or both of the sensors and the terminal, in combination with the methods mentioned in this document, will effectively prevent spoofing of the identifier to result in a presence detection result.

Ahead of the embodiment description, a glossary of terms and expressions employed below is given first:

System 1 The assembly of a sensor 4, terminal 3, both in in area 2, and a remote or proximal server 5.

Area 2 A physical area 2, that has or is associated with a Presence Sensor 4

Smart device 3 A mobile terminal 3 capable of displacement, receiving a sensor identifier when in range of the sensor 4 and communicating with the server, for example a Central Mediation Server 5.

Presence Sensor 4 A sensor device capable of both transmission of a Unique Sensor Identifier and receiving of a Handshake Response Code from the server 5 or a presence identifier from the terminal 3 by means of a wireless communication protocol (such as but not limited to WiFi, Bluetooth, Bluetooth Low Energy etc.).

Reliable Detection Result Denoting a detection result that is impervious to spoofing of either Presence Sensor or Smart device. This means that tampering with or spoofing of either Presence Sensor or Smart device will not result in a Presence Detection Event.

Spoofing A method to duplicate or mimic the characteristics of another device in an attempt to potentially maliciously trigger a Presence Detection event.

Mediation Server 5 A central server that acts as a mediator between Smart Devices 3 and Presence Sensors 4 and forms and maintains an authenticated and secure communication link between both. It is responsible for providing the Presence Detection as a result of this method.

A first disclosed embodiment of the present disclosure is provided under reference to FIG. 1 for the system and FIG. 2 for a schematic of the method. The first disclosed method embodiment according to the present disclosure relates to presence detection using an on-premise connectionless handshake protocol.

The general architecture for this method is depicted in FIG. 1 and involves three actors: the Central Mediation Server 5 defining the server, a Presence Sensor 4 defining the sensor and a Smart device 3 defining the terminal.

The Central Mediation Server maintains a secure communication channel (using any communication technology) between both Presence Sensor 4 and the Smart device 3 and is required to generate a Presence Detection event upon successful detection based on the method outlined below.

Prior to the start of the detection method, it is assumed that preferably:

The presence sensor is authenticated with the central mediation server and is associated with the Area 2;

The smart device is authenticated with the central mediation server

The token holder has preferably provided a consent to allow presence detection on premise.

The method involves several steps to be executed sequentially by the above described components and is depicted in the diagram of the appended FIG. 2.

The method according to FIG. 2 is as follows:

1. The Presence Sensor 4 transmits (broadcasts) in the area 2 a Unique Sensor Identifier (USI). Preferably the USI is unique and determined or designated by the Central Mediation Server 5. The server 5 comprises at least a table or memory, linking the USI's of all sensors 4 to their locations, enabling determination of the location of a terminal 3, when in range of the sensor 4.
   To further enhance security, the designation of this identifier might be invalidated, refreshed or replaced after a certain amount of time at which the sensor will be designated a new identifier.
2. The Smart device 3 detects the transmission of the USI from the Presence Sensor 4.
3. The Smart device 3 sends a USI validation request to the Central Mediation Server 5.
4. The Central Mediation Server 5 receives the USI validation request from the Smart device 3.
5. The Central Mediation Server 5 then preferable determines if the token holder associated with the Smart device has previously consented to detection on premise and if the specified USI is valid.
6. If the user did not provide a Consent and/or the USI is invalid, the Central Mediation Server 5 preferably returns an Unknown return value to the Smart device, the Smart device 3 will then ignore the USI and the process stops.
7. If the user did provide a Consent and the USI is valid, the Central Mediation Server 5 generates a Handshake Response Identifier that is uniquely assigned to the combination of the USI and the Smart device 3 and sends this Handshake Response Code to the Smart device 3.
8. The Smart device 3 receives the Handshake Response Code from the Central Mediation Server 5.
9. The Smart device 3 transmits the Handshake Response Code to the sensor 4.
10. The Presence Sensor 4 detects the Handshake Response Code transmission from the Smart device 3.
11. The Presence Sensor 4 will send a validate request to the Central Mediation Server 5.
12. The Central Mediation Server 5 receives the validation request from the Presence Sensor 4.
13. The Central Mediation Server 5 will subsequently attempt to validate the Handshake combination of the Sensor and the Token Holder or at least the user or token holder's terminal or smart device 3.
14. Upon a successful validation, the Central Mediation Server 5 generates a Secure Presence Detection event and the process stops.
15. Upon a failed validation, the process stops.

A second embodiment of the present disclosure is provided under reference to FIG. 3 for the system and FIG. 4 for a schematic of the method. This embodiment relates to: Connection-less one way confirmation using a unique Presence Identifier.

The general architecture for his method is depicted in FIG. 3 and involves the same three actors: the Central Mediation Server 5, the Presence Sensor 4 and the Smart device 3. It does not require a Smart device capable of transmitting information to the Presence Sensor.

The Central Mediation Server 5 maintains a secure communication channel (using any communication technology) between both Presence Sensor 4 and the Smart device 3 and is required to generate a Presence Detection event upon successful detection based on the method outlined below. Prior to the start of the detection method, it is assumed that preferably:

The presence sensor is authenticated with the central mediation server and is associated with an Area;

The Smart device is authenticated with the central mediation server and is associated with a Token Holder; and The Token Holder has provided a consent to allow presence detection on premise.

The method involves steps to be executed sequentially and is depicted in the diagram of FIG. 4. The method comprises in this embodiment the following steps:

1. The Presence Sensor 5 transmits (broadcasts) in the area 2 a Unique Sensor Identifier (USI) as designated by the Central Mediation Server 5. The server 5 comprises at least a table or memory, linking the UST's of all sensors 4 to their locations, enabling determination of the location of a terminal 3, when in range of the sensor 4.
   To enhance security, the designation of this identifier might be invalidated after a certain amount of time at which the sensor will be designated a new identifier.
2. The Smart device 3 detects the transmission of the USI from the Presence Sensor 4.
3. The Smart device 3 attempts to validate the received USI with the Central Mediation Server 5.
4. The Central Mediation Server 5 receives the validation request from the Smart device 3.
5. The Central Mediation Server 5 determines if the USI is valid and preferably also whether the token holder associated with the Smart device has previously consented to detection on premise.
6. If the user did not provide a Consent and/or the USI is invalid, the Central Mediation Server 5 returns an Unknown return value, the Smart device 3 will ignore the USI and the process stops.
7. If the user did provide a Consent and the USI is valid, the Central Mediation Server 5 will generate a Presence identifier which uniquely identifies the combination of the Sensor 4 and Smart device 3 and transmits this identifier to both Smart device 3 and Sensor 4.
   At this stage, the server 5 might generate a provisional Detection Result.
8. The Smart device 3 optionally receives the Partial Presence identifier. This might be necessary for the Smart device 3 to be able to detect the complete Presence Identifier later in this process.
9. The Sensor 4 receives the Presence Identifier
10. The Sensor 4 transmits the Presence identifier.
11. The Smart device 3 receives the Presence Identifier.
    if the Smart device 3 previously only received the Partial Presence Identifier, it has now obtained the complete Presence Identifier.
12. The Smart device 3 requests validation of the Presence Identifier.
13. The Central Mediation Server 5 receives the validation request.
14. The Central Mediation Server 5 determines if the combination of Smart device 3 and the specified Presence Identifier are valid.
15. If the combination is valid, the Central Mediation Server 5 generates a Secure Presence Detection event and the process stops.

16. If the combination is invalid, the Central Mediation Server 5 does not generate an event and the process stops.

Based on the foregoing embodiment description, the preamble to the description and the appended claims, the skilled reader has been supplied with sufficient information as to how to implement specific embodiments of the present disclosure. In this respect it's noted here that the scope of protection for the the present disclosure is by no means limited to any of the specifically disclosed embodiments, and the scope is to be determined exclusively based on the claims.

The invention claimed is:

1. Method of presence detection in a system of stationary sensors at predetermined locations, at least, one user owned mobile terminal such as a smart device, and a server storing links between each of the sensors and a location thereof, the method comprising:
   broadcasting, by the sensor, a sensor identifier from each of the sensors;
   detecting, by the terminal, at least one of the sensor identifiers;
   forwarding, by the terminal, the detected sensor identifier to the server;
   determining, by the server, of a location of the terminal to be the same as that of the sensor, based on the sensor identifier;
   sending, by the server, of a verification request, based on the received sensor identifier, to at least one of the sensor and the terminal;
   generating, by the at least one of the sensor and the terminal, of a response to the verification request and transmitting the response;
   generating a validation request based on the received response and transmitting the validation request to the server
   validating, by the server, of the validation request based on the response to the verification request;
   transmitting the response to the verification request from the at least one of the sensor and the terminal to the other of the sensor and the terminal; and
   generating, by the other of the sensor and the terminal, of the validation request based on the received response to the verification request for transmission of the validation request to the server.

2. The method of claim 1, further comprising transmitting, by the server, a location linked to the sensor identifier to at least one of the sensor and the terminal.

3. The method of claim 1, wherein the sensor identifier is unique for each of the stationary sensors.

4. The method of claim 1, wherein broadcasting the sensor identifier comprises employing a short range communication protocol, from a group of protocols comprising WiFi, BlueTooth, Bluetooth Low Energy, or Zigbee.

5. The method of claim 1, wherein the sending, by the server, of a verification request, based on the received sensor identifier, to at least one of the sensor and the terminal comprises sending, by the server, of a handshake response identifier to the terminal.

6. The method of claim 5, wherein the generating, by the terminal, of a response to the verification request and transmitting the response to the sensor comprises simply forwarding the handshake response identifier to the sensor.

7. The method of claim 6, wherein the generating, by the sensor, of a validation request based on the received response and transmitting the validation request to the server is based on the received handshake response identifier enabling the server to perform validation thereof.

8. The method of claim 1, wherein the sending, by the server, of a verification request, based on the received sensor identifier, to at least one of the sensor and the terminal comprises sending, by the server, of a presence identifier to the sensor.

9. The method of claim 8, wherein the generating, by the terminal, of a response to the verification request and transmitting the response to the sensor comprises simply forwarding the presence identifier to the terminal.

10. The method of claim 9, wherein the generating, by the terminal, of a validation request based on the received response and transmitting the validation request to the server is based on the received presence identifier enabling the server to perform validation thereof.

11. A system, comprising:
   stationary sensors at predetermined locations;
   at least one user owned mobile terminal such as a smart device; and
   a server storing links between each of the sensors and a location thereof,
   wherein the sensors, the terminal and the server are configured to:
      broadcast, by the sensor, a sensor identifier from each of the sensors;
      detect, by the terminal, at least one of the sensor identifiers;
      forward, by the terminal, the detected sensor identifier to the server; and
      determine, by the server, of a location of the terminal to be the same as that of the sensor, based on the sensor identifier,
      send, by the server, a verification request, based on the received sensor identifier, to at least one of the sensor and the terminal;
      generate, by the at least one of the sensor and the terminal, of a response to the verification request and transmitting the response to the other of the sensor and the terminal;
      generate, by the other of the sensor and the terminal, of a validation request based on the received response and transmitting the validation request to the server; and
      validate, by the server, of the validation request based on the response to the verification request.

12. A mobile terminal comprising:
   a detector configured to detect at least one sensor identifier broadcast by a sensor;
   a transmitter configured to forward the detected at least one sensor identifier to a server; and
   a generator,
   wherein if a verification request generated by the server on the basis of the at least one sensor identifier is received by the terminal, the generator is configured to generate a response to the verification request and to transmit the response to the verification request to the sensor for the sensor to generate a validation request based on the response to the verification request transmitted to the sensor and for the sensor to transmit the validation request to the server for the server to validate the validation request, and
   wherein if the verification request generated by the server on the basis of the at least one sensor identifier is received by the sensor and the sensor is configured to generate the response to the verification request, the generator is configured to generate the validation request based on the response to the verification request received from the sensor and to transmit the validation request to the server for the server to validate the validation request.

13. A sensor comprising:

a transmitter configured to broadcast at least one sensor identifier to at least one terminal; and a generator, wherein if a verification request generated by a server on the basis of the at least one sensor identifier is received by the sensor, the generator is configured to generate a response to the verification request and to transmit the response to the at least one terminal for the at least one terminal to generate a validation request, based on the response transmitted to the terminal and for the at least one terminal to transmit the validation request to the server for the server to validate the validation request and, wherein if the verification request generated by the server on the basis of the at least one sensor identifier is received by the at least one terminal and the at least one terminal is configured to generate the response to the verification request, the generator is configured to generate the validation request based on the response to the verification request received from the at least one terminal and to transmit the validation request to the server for the server to validate the validation request.

14. A server comprising:

a receiver configured to receive a detected sensor identifier from a terminal;

a processor configured to determine a location of the terminal to be the same as that of at least one sensor based on a sensor identifier broadcast by the sensor and received from the terminal by the receiver; and a generator configured to generate a verification request based on the received detected sensor identifier and to transmit the verification request to either the at least one sensor or the terminal for the one of the sensor and the terminal to generate a response to the verification request and transmit the response to the other of the sensor and the terminal in order for the other of the sensor and the terminal to generate a validation request based on the received response, wherein the receiver is further configured to receive the validation request from the at least one sensor if the verification request is received by the terminal or from the terminal if the verification request is received by the at least one sensor, and wherein the processor is further configured to validate the validation request based on the response to the verification request transmitted to the server by the at least one sensor if the verification request is received by the terminal or by the terminal if the verification request is received by the at least one sensor.

* * * * *